United States Patent
Cheng et al.

(10) Patent No.: US 10,031,853 B2
(45) Date of Patent: Jul. 24, 2018

(54) UNIFIED IN-MEMORY CACHE

(71) Applicant: International Business Machines Corporation, Armonk, NY (US)

(72) Inventors: Jin Cheng, Beijing (CN); Cheng Ding, Beijing (CN); Zhiyong Tian, Beijing (CN); Yong Zheng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/265,900

(22) Filed: Sep. 15, 2016

(65) Prior Publication Data

US 2018/0074966 A1 Mar. 15, 2018

(51) Int. Cl.
*G06F 12/08* (2016.01)
*G06F 12/0866* (2016.01)
*G06F 3/06* (2006.01)

(52) U.S. Cl.
CPC .......... *G06F 12/0866* (2013.01); *G06F 3/065* (2013.01); *G06F 3/067* (2013.01); *G06F 3/0619* (2013.01); *G06F 2212/217* (2013.01)

(58) Field of Classification Search
CPC .............. G06F 12/0866; G06F 12/0868; G06F 12/0871
See application file for complete search history.

(56) References Cited

U.S. PATENT DOCUMENTS

| | | | |
|---|---|---|---|
| 6,119,151 A | 9/2000 | Cantrell et al. | |
| 6,760,815 B1* | 7/2004 | Traversat | G06F 9/45504 707/999.202 |
| 2008/0065644 A1* | 3/2008 | Pasupuleti | G06F 17/30551 |
| 2012/0311065 A1 | 12/2012 | Ananthanarayanan et al. | |

OTHER PUBLICATIONS

Ghodsi, A. et al., "Tachyon: Reliable, Memory Speed Storage for Cluster Computing Frameworks," In Proc. of the ACM Sum. on Cloud Computing, Nov. 3, 2014, 15 pg.
"Centralized Cache Management in HDFS—ASF JIRA," [online] Apache.org, [retrieved Aug. 31, 2016], retrieved from the Internet: <https://issues.apache.org/jira/browse/HDFS-4949>, 26 pg.
McCabe, C. et al., "New in CDH 5.1: HDFS Read Caching," [online] Cloudera Engineering Blog, Aug. 11, 2014, retrieved from the Internet: <http://blog.cloudera.com/blog/2014/08/new-in-cdh-5-1-hdfs-read-caching/>, 15 pg.
(Continued)

*Primary Examiner* — Reginald G Bragdon
*Assistant Examiner* — Thanh D Vo
(74) *Attorney, Agent, or Firm* — Cuenot, Forsythe & Kim, LLC

(57) ABSTRACT

In-memory caching can include providing, in a data node, a pinned memory space for caching data in a distributed file system. The data that is cached in the pinned memory space is prevented from being swapped out. A virtual address is assigned to the data. The virtual address is mapped to a memory address of the data in the pinned memory space for accessing the data by an application.

20 Claims, 5 Drawing Sheets

(56) References Cited

OTHER PUBLICATIONS

"Alluxio—Open Source Memory Speed Virtual Distributed Storage," [online] Alluxio Open Foundation (formely Tachyon) [retrieved Aug. 31, 2016], retrieved from the Internet: <http://www.alluxio.org>, 5 pg.

"Quick Start Guide—Docs," [online] Alluxio Open Foundation (formely Tachyon) [retrieved Aug. 31, 2016], retrieved from the Internet: <http://www.alluxio.org/docs/master/en/Getting-Started.html>, 10 pg.

\* cited by examiner

UNIFIED IN-MEMORY CACHE

BACKGROUND

In-memory computing involves an architecture where data is kept inside a memory of a computer rather than on its disk drives. By keeping data in a memory, this architecture especially applies to big data applications that require extensive access to data (such as data analytics, data reporting or data warehousing). As data sets continue to grow, storage is increasingly becoming a critical bottleneck in many workloads. Therefore, memory-centric distributed storage systems enabling reliable data sharing at memory speed across cluster jobs have been developed for such architecture. These systems usually enable in-memory caching to achieve better performance of big data applications.

Although the distributed storage systems support in-memory caching on the top of the data nodes equipped in the distributed storage system, the performance of this mechanism may not satisfy the increasing requirements from big data applications.

SUMMARY

In general, example embodiments of the present disclosure include a method, device and computer program product for in-memory caching.

In one aspect, embodiments of the present disclosure provide a computer-implemented method. In the method, a pinned memory space for caching data is provided in a data node, where the data that is cached in the pinned memory space is prevented from being swapped out. Then, a virtual address is assigned to the data, and the virtual address is mapped to a memory address of the data in the pinned memory space for accessing the data by an application.

In another aspect, embodiments of the present disclosure provide a device. The device comprises a processing unit; and a tangible storage medium having instructions stored thereon for execution by the processing unit, the instructions, when executed by the processing unit, cause the device to perform a method. In the method, a pinned memory space for caching data is provided in a data node, where the data that is cached in the pinned memory space is prevented from being swapped out. Then, a virtual address is assigned to the data, and the virtual address is mapped to a memory address of the data in the pinned memory space for accessing the data by an application.

In yet another aspect, embodiments of the present disclosure provide a computer program product comprising a computer readable storage medium having program instructions embodied therewith. The program instructions executable by a device to cause the device to provide in a data node a pinned memory space for caching data, where the data that is cached in the pinned memory space is prevented from being swapped out; and assign a virtual address to the data, where the virtual address is mapped to a memory address of the data in the pinned memory space for accessing the data by an application.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principles of the present disclosure will now be described with reference to some example embodiments. It is to be understood that these embodiments are described only for the purpose of illustration and to help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
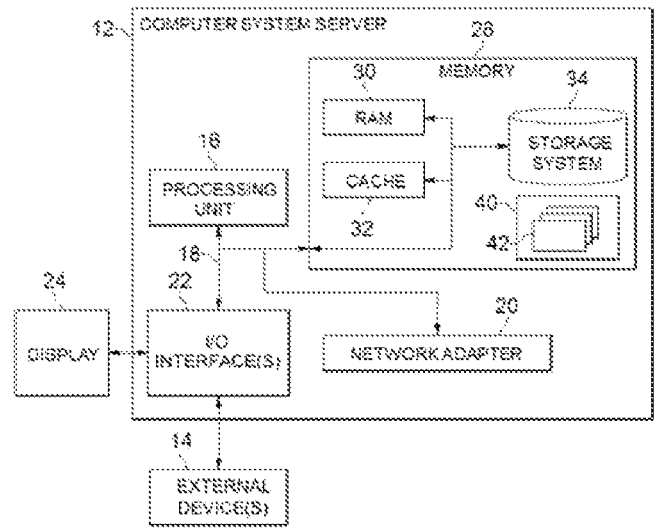
FIG. 1 is a block diagram of an electronic device in which embodiments of the present disclosure can be implemented.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Some approaches have been proposed to support in-memory caching. However, these approaches may have different disadvantages. For example, for the in-memory caching in a Portable Operating System Interface (POSIX) based distributed file system, such as General Parallel File System (GPFS), an interactive mode may not be supported. Therefore, applications cannot control what data to be cached and/or what data not to be cached, which results in low cache hit rates and poor efficiency. For the in-memory caching in a non-POSIX based distributed file system, such as Hadoop Distributed File System (HDFS), it may only cache data that have been stored in disks. Therefore, data within one node cannot be cached in other nodes than the one node. For in-memory caching enabled middle ware, such as Tachyon, the caching enabled middle ware needs to work in conjunction with an underlying file system (for example, HDFS). It may write data into the underlying file system for permanent storage in disks in case the memory size is not sufficient. Therefore, it may cache the same data more than once, which may cause poor efficiency of memory use.

As described above, in order to achieve better performance of big data applications, distributed file systems usually implement in-memory caching mechanisms for data sharing at memory speed across cluster jobs. However, these conventional in-memory caching solutions are not unified. Some solutions lack certain important features, such as the controllability of data to be cached. Other solutions may introduce certain limitations, such as the limitation on the position to cache the data and the like. Therefore, while operating on different distributed file systems, applications may need to have different implementations. This may bring quite a lot of inconvenience and thus result in poor efficiency.

In order to solve the above and potential other problems, a solution for unified in-memory caching is provided in accordance with embodiments of the present disclosure. According to one embodiment of the present disclosure, a computer-implemented method is provided. In the method, a pinned memory space for caching data is provided in a data node, where the data that is cached in the pinned memory space is prevented from being swapped out. Then, a virtual address is assigned to the data, and the virtual address is mapped to a memory address of the data in the pinned memory space for accessing the data by an application.

Figure 2:
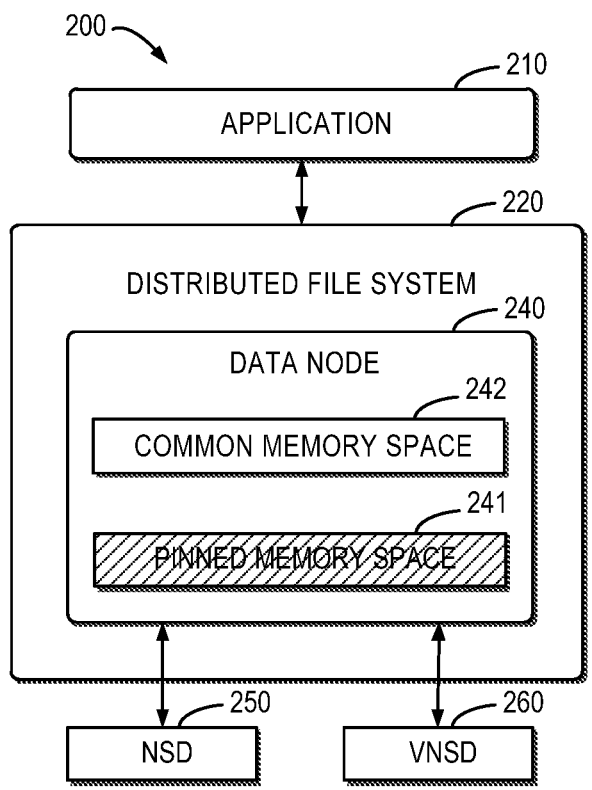
FIG. 2 shows a block diagram for in-memory caching in accordance with embodiments of the present disclosure.

FIG. 2 shows a block diagram 200 for caching data in accordance with embodiments of the present disclosure. It is to be understood that the structure and functionality of the block diagram 200 are described only for the purpose of illustration without suggesting any limitations as to the scope of the present disclosure. The embodiments of the present disclosure can be embodied with a different structure and/or functionality.

As shown in FIG. 2, the block diagram 200 may generally include an application 210, a distributed file system 220 and at least one data node 240 (for the sake of simplicity, only one data node 240 is illustrated in FIG. 2). The data node may be a node which is used to provide storage in the distributed file system, and the data node may be implemented by various techniques, for example, the data node may be a call by a Datallode in Hadoop HDFS, or an NSD server in IBM GPFS.

The application 210 may be, for example, a big data application or any of other kinds of applications. The application 210 may operate on the distributed file system 220, which may provide file system interfaces to the application 210. For example, the distributed file system 220 may include at least one of the following: POSIX based distributed file system, such as GPFS; non-POSIX based distributed file system, such as HDFS; or any other kind of distributed file systems.

It is appreciated that the distributed file system is a logical concept and various approaches are proposed to cluster multiple data nodes into one distributed file system and provide a logical portal for accessing the multiple data nodes. According to the disclosure hereinafter, those skilled in the art may accommodate the embodiments to various environments and details of the implementations may be modified based on the dedicated technical requirement(s) for supporting the distributed file system.

The block diagram 200 may further include one or more physical storage devices. As used herein, the phrase "physical storage device" refers to a block storage device, such as a hard disk or the like. The one or more physical storage devices may be coupled to one or more data nodes directly or indirectly, such as via a network. Therefore, the one or more physical storage devices are accessible to the one or more nodes. As used herein, the term "data node" refers to a host or a computer that is used to cache data. For the sake of simplicity, only one data node 240 and one physical storage device 250 connected with the data node 240 are shown in FIG. 2.

It is to be understood that the physical storage device 250 may be connected with another data node rather than the data node 240, but the data node 240 can still access the physical storage device 250 via the network, for example. Because the one or more physical storage devices are shared by the one or more data nodes, in the following discussions, the physical storage device 250 may also be referred to as "shared block device (SBD) 250" or "network shared disk (NSD) 250".

The data node 240 may comprise a pinned memory space 241 and a common memory space 242. In some operating systems, such as LINUX, data in physical memory may be automatically swapped out to disk space in order to free more physical memory for applications. In the context of the present disclosure, a pinned memory space refers to the memory space that is prevented from being swapped out. The pinned memory space 241 may act as a memory space for persistently hosting the data, and the common memory space 242 may be common memory in the data node 240, where the data may be automatically swapped in/out in case of a shortage of free pages in the common memory space according to a predefined rule such as First In First Out (FIFO).

The pinned memory space 241 of the data node 240 can be used to cache data. The data within the pinned memory space 241 will be always kept in physical memory without being swapped out. In addition to storing the data in the pinned memory space 241, a virtual address may be assigned to the cached data. The virtual address may be mapped to a memory address of the cached data in the pinned memory space 241.

In a traditional approach, various data (for example, data A and data B) may be loaded into the memory during the running of the application. In this example, the data A may be data that will be frequently accessed by the application, and the data B may be data that will be accessed by the application once. Although the data A may be accessed by the application for several times, according to a traditional approach, the data A may be swapped out of the common memory when a memory shortage occurs and new data needs to be loaded in the common memory. At this time, the data A may be swapped in and out frequently, thereby the performance of the application may be poor.

With the pinned memory space 241 as shown in FIG. 2 of the present disclosure, the data A that will be accessed frequently by the application 210 may be loaded in the pinned memory space 241, and the data B that will be accessed by the application 210 with limited times may be loaded in the common memory space 242. As the data A will not be swapped out, the pinned memory space 241 may provide a dedicated memory space for the application 210 to ensure that the application 210 will always access the cached data A at a high speed. Thereby, the performance of the application 210 may be greatly increased.

Figure 3:
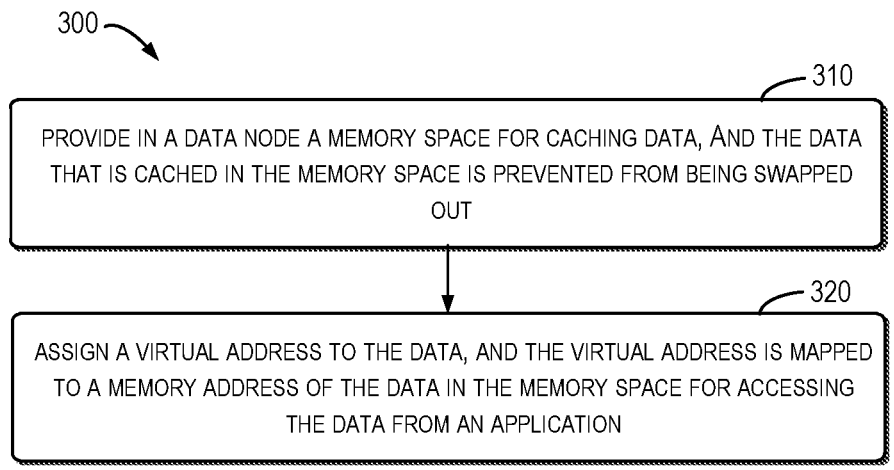
FIG. 3 shows a flowchart for a method for in-memory caching in accordance with embodiments of the present disclosure.

FIG. 3 shows a flowchart 300 for a method for in-memory caching in accordance with embodiments of the present disclosure. In step 310, a pinned memory space for caching data is provided in a data node, where the data that is cached in the pinned memory space is prevented from being swapped out. As the data cached in the pinned memory space will not be swapped out, the application may always access the cached data at a high speed.

Then, in step 320, a virtual address is assigned to the data, where the virtual address is mapped to a memory address of the data in the pinned memory space for accessing the data by an application. In this embodiment, the virtual address may be a unified address that may be called by the application, and the virtual address may provide a shortcut for accessing the data. Accordingly, the application may access the cached data in a convenient and fast way, such that the performance of the application may be increased further.

With the above embodiment, the pinned memory space according to FIGS. 2 and 3 serves as a dedicated memory for caching data for the application, and it may provide a pool for caching the important data, such as the frequently used data, to-be-used data and the like. With the pinned memory space, the important data will be cached in the pinned memory when necessary.

In one embodiment of the present disclosure, the data may be directly accessed by the application by using the virtual address. As the pinned memory space for caching data is implemented in the level of the data node, the virtual address may act as a pointer for directly accessing the cached data. Compared with the prior art solution of in-memory caching with middle ware, in this embodiment, the data does not need to be cached at different levels twice. Instead, the data may be cached in the data node of the distributed file system only one time. Further, as the data may be directly accessed by using the virtual address, thereby the embodiment does not need extra coordination between the middle ware and the underlying file system.

In one embodiment of the present disclosure, the pinned memory space may be a local memory equipped in the data node. As the memory is directly equipped in the data node, it may provide a high speed for accessing the data cached therein. As the local memory has a limited size that may not meet the size requirement for the application, in another embodiment, the data that is to be accessed by the application may be cached in a remote pinned memory provided in another data node. Although the speed of accessing the remote pinned memory is not as high as that of accessing the local pinned memory, in some situations, the remote pinned memory is faster when the size of the cached data is small.

Figure 4:
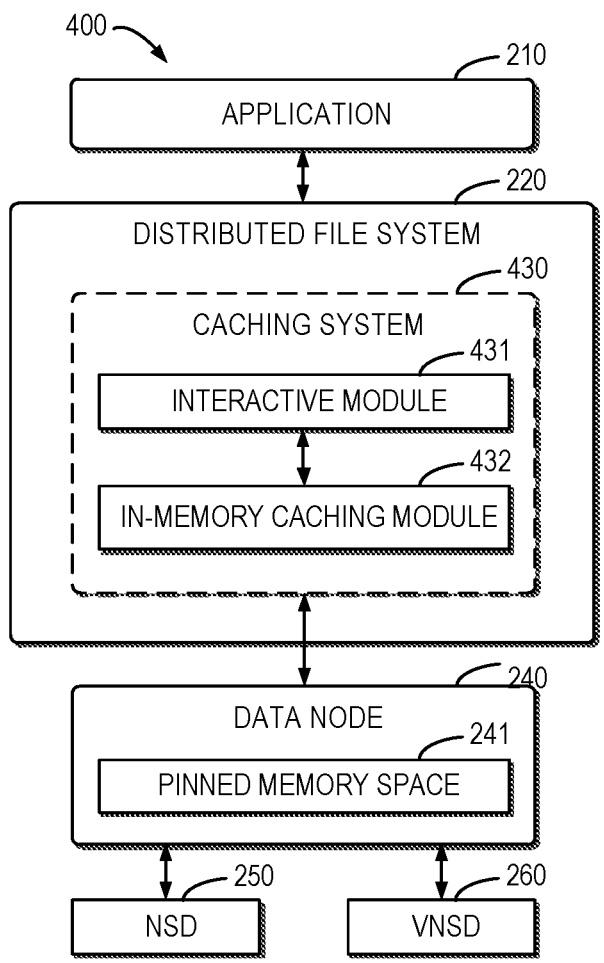
FIG. 4 shows a block diagram for in-memory caching in accordance with embodiments of the present disclosure.

In one embodiment of the present disclosure, the data may be cached in the memory in response to receiving a first command from the application for caching the data. Reference will be made to FIG. 4 for further details, where FIG. 4 shows a block diagram 400 for in-memory caching in accordance with embodiments of the present disclosure. Compared with FIG. 2, a caching system 430 as shown with dashed lines is added into FIG. 4. Although the caching system 430 is shown as an individual layer between the data node 240 and the distributed file system 220, the caching system 430 may be implemented in the distributed file system 220 or under the layer of the distributed file system 220. Alternatively, the caching system 430 may be implemented in the data node 240. For example, the application 210 may directly send a command to the caching system 430 for caching data.

Alternatively, the application 210 may send a command from the application for caching data to the caching system 430 via the distributed file system 220 if the caching system 430 is implemented in the distributed file system 220. For example, the caching system 430 may be implemented by computer system/server 12 as discussed with reference to FIG. 1. The caching system 430 may include an interactive module 431 and an in-memory caching module 432.

The interactive module 431 may be configured to receive a command(s) from the application 210 directly or indirectly (such as via the distributed file system 220), and to return to the application 210 a result of executing the command. In this way, the interactive module 431 may provide interfaces for caching data or not caching the data, configuration (such as, setting the attributes of the caching) and/or querying (such as, querying the cached data). The in-memory caching module 432 may be configured to operate in accordance with the command received by the interactive module 431. For example, in response to a command for caching data being received by the interactive module 431, the in-memory caching module 432 may perform the in-memory caching of the data.

In embodiments of the present disclosure, the first command may be submitted by the application according to various situations during the running of the application. In one embodiment of the present disclosure, the first command may be submitted in response to determining that the data is to be accessed by the application. Then, the data may be cached by loading the data into the pinned memory space. The first command may be submitted before the application is initiated or after it is initiated. For example, if it is determined that the application will access a certain data block, then the first command may be submitted to preload the data block into the pinned memory space in advance. As the data block is already cached in the pinned memory space in advance, the time cost for loading the data block may be saved so as to increase the performance of the application.

In embodiments of the present disclosure, the first command may be submitted in response to determining that the data is currently stored on a common memory space of the data node. Then, the data may be cached by copying the data from the common memory space to the pinned memory space. In this embodiment, the common memory space may be the common memory space 242 as shown in FIG. 2.

Referring back to FIG. 2, during the running of the application 210, one data block may be loaded into the common memory space 242 according to the traditional work flow of the common memory space 242. Then, a first command may be submitted to instruct the pinned memory space 241 to cache the data block. At this point, the data block may be directly copied from the common memory space 242 into the pinned memory space 241. In this embodiment, after the data block is copied into the pinned memory space 241, the data block will be cached in the memory until it is notified that the cached data block is of no use anymore and should be removed from the pinned memory space 241.

In one embodiment of the present disclosure, the virtual address may be stored in a virtual physical storage device that is accessible to the data node. The mapping between the virtual address and memory address of the cached data may be stored in a virtual storage device created by the data node 240, such as the virtual network shared disk (VNSD) 260 as shown in FIG. 2. The virtual storage device can be accessible to other nodes via the network, for example. With the virtual address stored in the virtual storage device, other nodes can read the cached data in the data node 240. For the sake of simplicity, only one virtual storage device (that is, the virtual storage device) is shown in FIG. 2. It is to be understood that two or more virtual storage devices may be created by the node 240, and the capacity of all of the virtual storage devices associated with the data node 240 may correspond to the in-memory caching capacity of the data node 240 (for example, the size of the pinned memory space 241). Because the virtual storage device can be shared by a plurality of nodes, which is similar to the physical storage device 250, in the following discussions, the virtual storage device may also be referred to as "virtual shared block device (VSBD)" or "VNSD".

Those skilled in the art may adopt various types of storage devices to implement the pinned memory space as described above. In one embodiment of the present disclosure, the pinned memory space may be coupled to a data pool including one or more network shared disks (NSDs), or a cache pool including one or more virtual network shared disk. With the data pool and/or cache pool, the pinned memory space may be scaled according to specific requirements for running the application. For example, if the application is heavily dependent on big data and has a high requirement in real-time processing, then a further NSD and/or VNSD may be added into the memory space. At this point, the data may be loaded into the NSD and/or VNSD and the virtual address may be mapped to the memory address of the loaded data for a direct access by the application.

In some embodiments, a plurality of network shared disks can be grouped into a plurality of collections. Each of the plurality of collections can be referred to as "a data pool". The NSDs in a data pool may be connected with different nodes. A data pool may be assigned to one or more applications for being used. The data pool may be enlarged by adding additional NSDs to it, or may be shrunk by removing some NSDs from the data pool. The distributed file system, such as the distributed file system 220 as shown in FIG. 2, may provide a sub-file-system management unit to manage a data pool, which can be referred to as "a data fileset". A data fileset may provide file system interfaces with respect to a data pool to an application which the data pool is assigned to.

Likewise, a plurality of VNSDs can be grouped into a plurality of collections. Each of the plurality of collections can be referred to as "a cache pool". The VNSDs in a cache pool may be created by different nodes. A cache pool may be assigned to one or more applications for being used. The cache pool may be enlarged by adding additional VNSDs to it, or may shrink by removing some VNSDs from it. The distributed file system, such as the distributed file system 220 as shown in FIG. 4, may provide a sub-file-system management unit to manage a cache pool, which can be referred to as "a cache fileset". A cache fileset may provide file system interfaces with respect to a cache pool to an application which the cache pool is assigned to.

Figure 5:
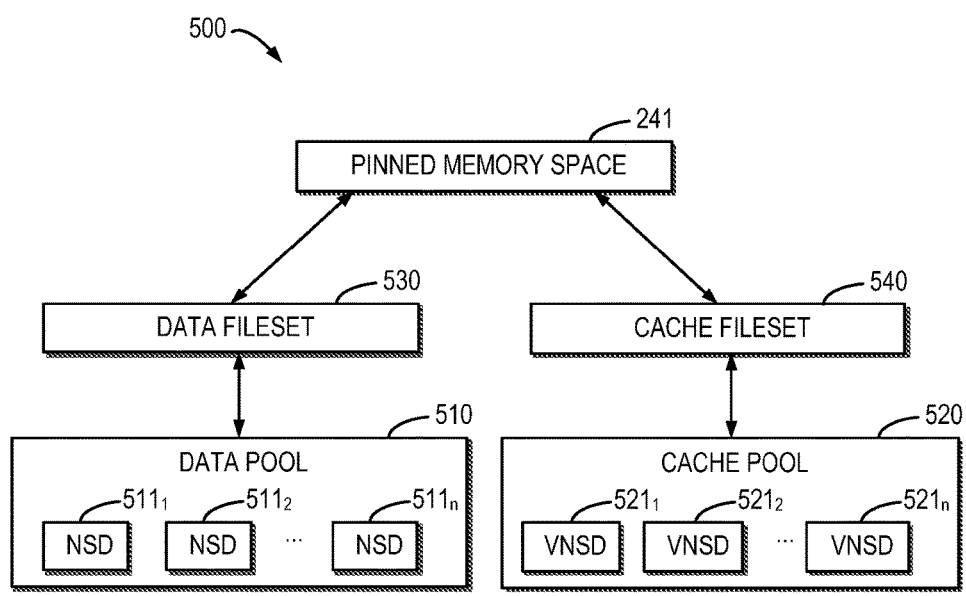
FIG. 5 shows a block diagram for in-memory caching in accordance with embodiments of the present disclosure.

FIG. 5 shows a block diagram 500 of the implementation of the pinned memory space of FIG. 2 in accordance with embodiments of the present disclosure. More particularly, in FIG. 5, the block diagram 500 shows the relationship between a data pool and a data fileset and that between a cache pool and a cache fileset. It is to be understood that this is only for the purpose of illustration without suggesting any limitations as to the scope of the present disclosure.

As shown in FIG. 5, the pinned memory space 241 may include a data filesets 530 and a cache filesets 540. In this example, the data fileset 530 may be implemented by a data pool 510, which may include a plurality of NSDs, such as NSDs $511_1$, $511_2$ ... $511_n$ (collectively referred to as NSDs 511). Likewise, the cache fileset 540 may be implemented by a cache pool 520, which may include a plurality of VNSDs, such as VNSDs $521_1$, $521_2$ ... $521_n$ (collectively referred to as VNSDs 521).

In some embodiments, the data fileset 530 may be mounted on a first directory, for example, "/mount/data." Likewise, the cache fileset 540 may be mounted on a second directory, for example, "/mount/cache." In this way, in the case that the application performs some operations on the first and/or second directories, corresponding commands may be sent to load the corresponding data from the respective directories.

For example, if the application copies a first file from the first directory to the second directory, the application may instruct that the first file stored in the NSDs 511 needs to be cached by a node. In the case that the application removes the first file from the second directory, the application may instruct that the first file cached by the node should not be cached any more. If the application creates a second file in the second directory, the application may instruct that the second file missed in any of the NSDs 511 needs to be cached by a node. The above examples show the way to send commands from the application. It is to be understood that the above examples are only described for the purpose of illustration without suggesting any limitations as to the scope of the present disclosure.

In one embodiment of the present disclosure, the first command may indicate an attribute associated with the caching of the data, and the attribute may be stored in association with the data in the pinned memory space. For example, the attribute may include at least one of the following: the longest time to cache the data, the maximum copies to be cached for the data, and the size limit of the data to be cached. The attribute may be stored in association with the data in the pinned memory space 241 of the data node 240. For example, for caching a file in LINUX, the attributed may be stored in a data structure called "inode" associated with the file.

In another example, the attribute may be a priority associated with the data. Although the pinned memory space may be extended, in some cases, there may be a shortage of free space in the pinned memory space. Accordingly, priorities may be assigned to the respective application. For example, if Application A has a higher priority, compared with Application B with a lower priority, the data that is to be accessed by the Application A may be preferentially loaded into the pinned memory space. In another example, those skilled in the art may set other attributes to the data. For example, the priority may be assigned to a specific data block, and the data block may be preferentially loaded into the pinned memory space no matter which application will access the data block.

In one embodiment of the present disclosure, the attribute may be updated in the pinned memory space in response to receiving a second command for setting the attribute. For example, the application 210 may send a second command to the caching system 430 for setting the attribute associated with the caching of the data. In this case, if the caching system 430 receives the second command, it may update the attribute in the pinned memory space 241 of the data node 240. Some further actions may need to be done by the caching system 430 to apply the updated attribute. For example, if the time for caching the data exceeds the updated longest time to cache the data, the data may be removed from the pinned memory space 241 of the data node 240 by the caching system 430.

During the running of the application, the stage of the application may change and thus the to-be-loaded data may change accordingly. For example, at the initialization stage of the application, a first data block may be frequently used by the application, then the first data block may be preferentially loaded into the pinned memory space to increase the performance of the application. Then, at another stage, the first data block may not be accessed by the application anymore and a second data block may be frequently used. At this point, the attributes for caching the data may be updated, such that the first data block may be removed from pinned memory space and the second data block may be loaded.

Figure 6:
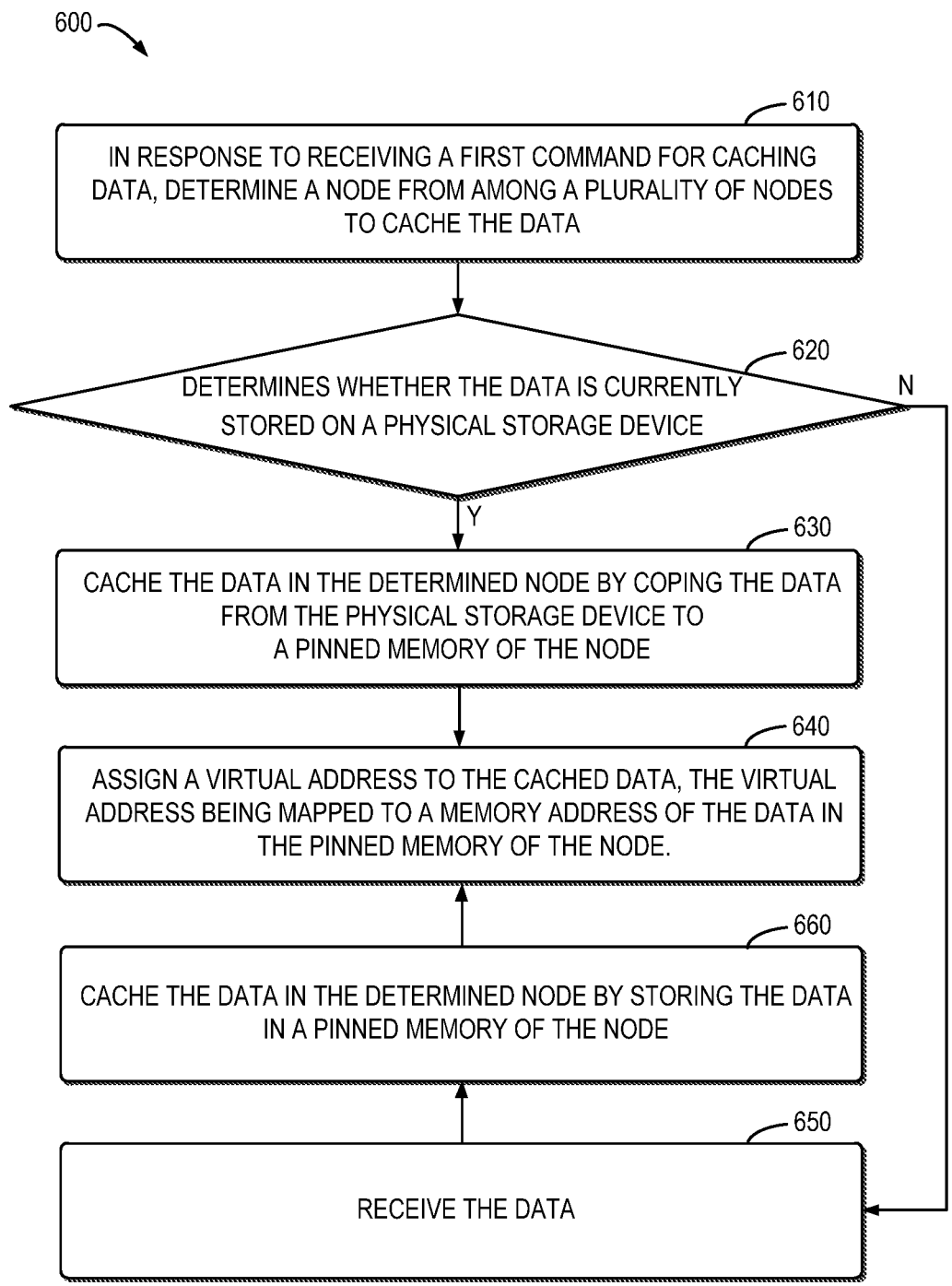
FIG. 6 is a flowchart of a method for in-memory caching in accordance with embodiments of the present disclosure.

FIG. 6 is a flowchart of a method 600 for in-memory caching in accordance with embodiments of the present disclosure. The method 600 will be described in connection with the block diagram 400 shown in FIG. 4. In some embodiments, the method 600 may be performed by the caching system 430 as shown in FIG. 4. It should be understood that the method 600 may also include additional steps (not shown) and/or may omit the illustrated steps. The scope of the present disclosure is not limited in this aspect.

The method 600 is entered in step 610, where the caching system 430 determines a node from among a plurality of nodes to cache data in response to receiving a first command for caching the data. In some embodiments, the node to cache the data can be determined based on a predefined policy. For example, a node connected with no NSD (that means the node works in a pure caching mode) may be determined to cache the data. For another example, a node with the maximum caching capacity (that is, the pinned memory space within the node has the biggest free space among the plurality of nodes) may be determined to cache the data. For the sake of simplicity, in the following discussions, the determined node refers to the data node 240 in FIG. 4.

Then, the method 600 proceeds to step 620, where the caching system 430 determines whether the data is currently stored on a common memory space. The caching system 430 may determine from the command that whether the data is currently stored on a NSD. In some embodiments, if the application 210 as shown in FIG. 4 instructs the caching system 430 to create and cache a file (for example, the application 210 creates a new file in /mount/cache), it may indicate that the file is not stored on a NSD. If the application 210 instructs the caching system 430 to cache a filed stored under a certain directory (for example, the application 210 copies the file from /mount/data to /mount/cache), it may indicate that the file is currently stored on an NSD.

If the caching system 430 determines that the data is currently stored on the physical storage device 250, the method 600 proceeds to step 630, where the caching system 430 caches the data in the data node 240 by copying the data from the physical storage device 250 to the pinned memory space 241 of the data node 240.

Then in step 640, the caching system 430 assigns a virtual address to the cached data. The virtual address is mapped to a memory address of the data in the pinned memory space 241 of the data node 240. In some embodiment, the virtual address may be stored in a virtual storage device created by the data node 240, such as the VNSD 260 as shown in FIG. 2. With the virtual address stored in the VNSD 260, other nodes can read the data cached in the data node 240.

However, if the caching system 430 determines that the data is missed in any of the common memory spaces, the method 600 proceeds to step 650, where the caching system 430 receives the data from the application 210. Then, in step 660, in response to receiving the data, the caching system 430 caches the data in the data node 240 by storing the data in the pinned memory space 241 of the data node 240. After step 660, the method also proceeds to step 640, where a virtual address is assigned to the cached data and the virtual address is mapped to a memory address of the data in the pinned memory space 241 of the data node 240.

The claimed solution may provide an interactive interface to an application for specifying data to be cached and attributes of the data caching. The data can be cached in any of a plurality of nodes no matter where the data is stored. Moreover, the data can be always cached in memory instead of being swapped out to disks when the amount of memory is insufficient. As a result, the solution enables the application to have a unified implementation even operating on different distributed file systems.

In a distributed file system, the big data is usually divided into multiple data blocks and more than one replica of the big data may be stored across a plurality of data nodes to improve the reliability of the storage. At this point, when the application is accessing the big data across the plurality of data nodes, replicas of different data blocks in the big data may be cached in different data nodes.

In one embodiment of the present disclosure, in response to determining that respective replicas of the data are stored in respective data nodes, one data node may be selected from the respective data nodes. Then, the data may be cached by loading a replica being stored on the selected data node into the pinned memory space.

Figure 7:
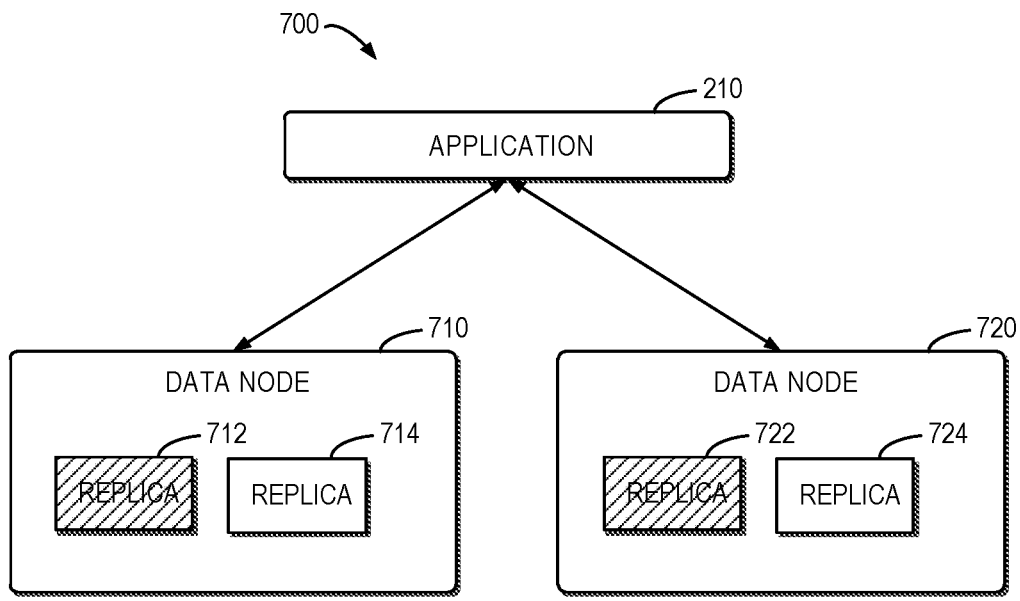
FIG. 7 is a block diagram for in-memory caching across a plurality of data nodes in accordance with embodiments of the present disclosure.

FIG. 7 is a block diagram 700 for in-memory caching among a plurality of data nodes in accordance with embodiments of the present disclosure. As shown in FIG. 7, the application 210 may access the data including a first and a second data block. In this figure, a replica 712 shown with a shaded block indicates one copy of the first data block, and a replica 722 shown with a shaded block indicates another copy of the first data block. Likewise, the replicas 714 and 724 are two copies of the second data block. Although two data blocks 710 and 720 and two copies are shown in this figure, in another embodiment, the more than two data nodes and more than two copies may be used.

As two copies of the same data block are stored in the data nodes 710 and 720 respectively, in order to reduce the usage in the pinned memory space in one data node, different data blocks may be cached in the two data nodes 710 and 720 respectively. For example, the replica 712 of the first data block may be cached in the pinned memory space of the data node 710, and the replica 724 of the second data block may be cached in the pinned memory space of the data node 720. In this embodiment, as the to-be-processed data blocks are evenly cached in the two data nodes, the usage of the pinned memory spaces in the two data nodes may be balanced, thereby the performance of the application may be further increased.

In some situations, when the application will not access the cached data anymore, or when the frequency for accessing the cached will go down, caching the data in the pinned memory space will not bring great benefits as before. At this point, the cached data may be removed from the pinned memory space to make room for more important data.

In one embodiment of the present disclosure, in response to receiving a third command for ceasing caching the data, the data may be removed from the pinned memory space, and the virtual address of the data may also be removed. In this embodiment, the application 210 may send to the caching system 430 a third command for ceasing caching the data. For example, the application 210 may removes a file from the cache fileset 540, which will instruct the caching system 430 that the file should not be cached any more.

Figure 8:
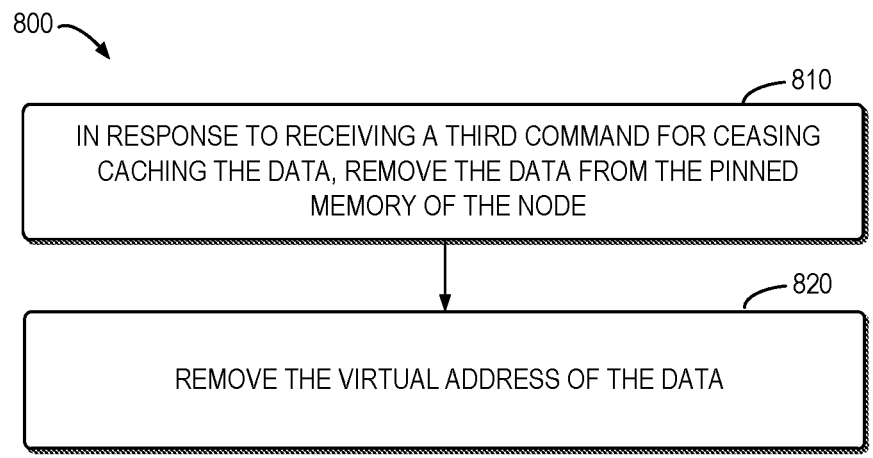
FIG. 8 is a flowchart of a method for ceasing in-memory caching in accordance with embodiments of the present disclosure.

FIG. 8 shows a flowchart of a method 800 for ceasing in-memory caching in accordance with embodiments of the present disclosure. The method 800 will be described in connection with the block diagram 400 shown in FIG. 4. For example, in some embodiments, the method 800 may be performed by the caching system 430. In some embodiments, the method 800 may be carried out after the method 600 in FIG. 6. However, it is to be understood that the method 600 is not necessarily performed prior to the method 800.

As described above, the caching system 430 may receive from the application 210 a third command for ceasing caching the data. For example, the data is cached in the data node 240. The method 800 is entered in step 810, where the caching system 430 removes the data from the pinned memory space 241 of the data node 240 in response to receiving the third command for ceasing caching the data. Then in step 820, the caching system 430 removes the virtual address of the data in the VNSD 260.

Through the above descriptions, it would be understood that embodiments of the present disclosure can provide a solution for unified in-memory caching. The solution can provide an interactive interface to an application for controlling what data to be cached and the attributes of the caching of the data. The solution enables the data to be cached in any of a plurality of nodes no matter where the data is originally stored. Moreover, the cached data can be always kept in memory instead of being swapped out to disks when the memory is not enough, e.g., is insufficient. As a result, the solution enables the application to have a unified implementation even operating on different distributed file systems.

The present disclosure may be a system, an apparatus, a device, a method, and/or a computer program product. The computer program product may include a computer readable storage medium (or media) having computer readable program instructions thereon for causing a processor to carry out aspects of the present disclosure.

According to one embodiment of the present disclosure, a device is provided. The device comprises a processing unit; and a tangible storage medium having instructions stored thereon for execution by the processing unit, the instructions, when executed by the processing unit, cause the device to perform a method. In the method, a pinned memory space for caching data is provided in a data node, and the data that is cached in the pinned memory space is prevented from being swapped out. Then, a virtual address is assigned to the data, where the virtual address is mapped to a memory address of the data in the pinned memory space for accessing the data by an application.

In one embodiment of the present disclosure, in response to receiving a first command from the application for caching the data, the data associated with the first command may be cached.

In one embodiment of the present disclosure, in response to determining that the data is currently stored on a common memory space of the data node, the data may be cached by copying the data from the common memory space to the pinned memory space.

In one embodiment of the present disclosure, in response to determining that the data is to be accessed by the application, the data may be cached by loading the data into the pinned memory space.

In one embodiment of the present disclosure, in response to determining that respective replicas of the data are stored in respective data nodes, the data node may be selected from the respective data nodes. Then, the data may be cached by loading a replica being stored on the selected data node into the pinned memory space.

In one embodiment of the present disclosure, the first command indicates an attribute associated with the caching of the data, the attribute may be stored in association with the data in the pinned memory space.

In one embodiment of the present disclosure, in response to receiving a second command for setting the attribute, the attribute may be updated in the pinned memory space.

In one embodiment of the present disclosure, the virtual address is stored in a virtual common memory space that is accessible to the data node.

In one embodiment of the present disclosure, in response to receiving a third command for ceasing caching the data, the data may be removed from the pinned memory space; and then the virtual address of the data may be removed.

According to one embodiment of the present disclosure, a computer program product being tangibly stored on a non-transitory machine-readable medium and comprising machine-executable instructions, the instructions, when executed on a device, causing the device to: provide in a data node a pinned memory space for caching data, the data that is cached in the pinned memory space being prevented from being swapped out; and assign a virtual address to the data, the virtual address being mapped to a memory address of the data in the pinned memory space for accessing the data by an application.

In one embodiment of the present disclosure, the instructions may further cause the device to, in response to receiving a first command from the application for caching the data, cache the data associated with the first command.

In one embodiment of the present disclosure, the instructions may further cause the device to, in response to determining that the data is currently stored on a common memory space of the data node, cache the data by copying the data from the common memory space to the pinned memory space.

In one embodiment of the present disclosure, the instructions may further cause the device to, in response to determining that the data is to be accessed by the application, cache the data by loading the data into the pinned memory space.

In one embodiment of the present disclosure, the instructions may further cause the device to, in response to determining that respective replicas of the data are stored in respective data nodes, select the data node from the respective data nodes; and cache the data by loading a replica being stored on the selected data node into the pinned memory space.

In one embodiment of the present disclosure, the first command indicates an attribute associated with the caching of the data. The instructions may further cause the device to store the attribute in association with the data in the pinned memory space.

In one embodiment of the present disclosure, the instructions may further cause the device to, in response to receiving a second command for setting the attribute, update the attribute in the pinned memory space.

In one embodiment of the present disclosure, the virtual address is stored in a virtual physical storage device that is accessible to the data node.

In one embodiment of the present disclosure, the instructions may further cause the device to, in response to receiving a third command for ceasing caching the data, remove the data from the pinned memory space; and remove the virtual address of the data.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is to be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   providing in a data node a pinned memory space for caching data, the data that is cached in the pinned memory space being prevented from being swapped out;
   assigning a virtual address to the data, the virtual address being mapped to a memory address of the data in the pinned memory space for accessing the data by an application, and
   in response to receiving a first command from the application for caching the data, caching the data associated with the first command, wherein the caching the data comprises:
      in response to determining that respective replicas of the data are stored on respective data nodes, selecting the data node from the respective data nodes; and
      caching the data by loading a replica being stored on the selected data node into the pinned memory space of the selected data node.

2. The method of claim 1, wherein the caching the data further comprises:
   in response to determining that the data is currently stored on a common memory space of the data node, caching the data by copying the data from the common memory space to the memory space.

3. The method of claim 1, wherein the caching the data further is in response to determining that the data is to be accessed by the application.

4. The method of claim 1, wherein the first command indicates an attribute associated with the caching of the data, and wherein the caching the data comprises:
   storing the attribute in association with the data in the pinned memory space.

5. The method of claim 4, further comprising:
   in response to receiving a second command for setting the attribute, updating the attribute in the pinned memory space.

6. The method of claim 4, further comprising removing the data from the pinned memory space, and removing the virtual address of the data in response to:
   receiving a third command for ceasing caching the data from the application; or
   the attribute indicating an expiration of the data.

7. The method of claim 1, wherein the data is directly accessed by the application by using the virtual address.

8. The method of claim 1, wherein, in a distributed file cluster, the pinned memory space is coupled to:
- a data pool including one or more network shared disks; or
- a cache pool including one or more virtual network shared disks.

9. A device comprising:
- a processing unit; and
- a tangible storage medium having instructions stored thereon for execution by the processing unit, the instructions, when executed by the processing unit, cause the device to perform operations including:
  - providing in a data node in a distributed file system a pinned memory space for caching data, the data that is cached in the pinned memory space being prevented from being swapped out;
  - assigning a virtual address to the data, the virtual address being mapped to a memory address of the data in the pinned memory space for accessing the data by an application, and
  - in response to receiving a first command from the application for caching the data, caching the data associated with the first command, wherein the caching the data comprises:
    - in response to determining that respective replicas of the data are stored on respective data nodes, selecting the data node from the respective data nodes; and
    - caching the data by loading a replica being stored on the selected data node into the pinned memory space of the selected data node.

10. The device of claim 9, wherein the caching the data comprises:
- in response to determining that the data is currently stored on a common memory space of the data node, caching the data by copying the data from the common memory space to the pinned memory space.

11. The device of claim 9, wherein the caching the data further is in response to determining that the data is to be accessed by the application.

12. The device of claim 9, wherein the first command indicates an attribute associated with the caching of the data, and wherein the caching the data comprises:
- storing the attribute in association with the data in the pinned memory space.

13. The device of claim 12, wherein the operations further comprise:
- in response to receiving a second command for setting the attribute, updating the attribute in the pinned memory space.

14. The device of claim 12, the operations further comprising removing the data from the pinned memory space, and removing the virtual address of the data in response to:
- receiving a third command for ceasing caching the data from the application; or
- the attribute indicating an expiration of the data.

15. The device of claim 9, wherein, in a distributed file cluster, the pinned memory space is coupled to a cache pool including one or more virtual network shared disks.

16. A computer program product comprising a computer readable storage medium having program instructions embodied therewith, the program instructions executable by a device to cause the device to:
- provide in a data node in a distributed file system a pinned memory space for caching data, the data that is cached in the pinned memory space being prevented from being swapped out;
- assign a virtual address to the data, the virtual address being mapped to a memory address of the data in the pinned memory space for accessing the data by an application, and
- in response to receiving a first command from the application for caching the data, caching the data associated with the first command, wherein the caching the data comprises:
  - in response to determining that respective replicas of the data are stored on respective data nodes, selecting the data node from the respective data nodes; and
  - caching the data by loading a replica being stored on the selected data node into the pinned memory space of the selected data node.

17. The computer program product of claim 16, wherein the instructions, when executed on the device, further cause the device to:
- in response to determining that the data is currently stored on a common memory space of the data node, cache the data by copying the data from the common memory space to the pinned memory space.

18. The computer program product of claim 16, wherein the first command indicates an attribute associated with the caching of the data, and wherein the caching the data comprises:
- storing the attribute in association with the data in the pinned memory space.

19. The computer program product of claim 18, wherein the instructions, when executed on the device, further cause the device to:
- in response to receiving a second command for setting the attribute, update the attribute in the pinned memory space.

20. The computer program product of claim 18, wherein the instructions, when executed on the device, further cause the device to remove the data from the pinned memory space, and remove the virtual address of the data in response to:
- receiving a third command for ceasing caching the data from the application; or
- the attribute indicating an expiration of the data.

* * * * *